United States Patent [19]

Edwards et al.

[11] Patent Number: 4,704,611

[45] Date of Patent: Nov. 3, 1987

[54] ELECTRONIC TRACKING SYSTEM FOR MICROWAVE ANTENNAS

[75] Inventors: David J. Edwards, East Barnet; Barry K. Watson, Godalming, both of England

[73] Assignee: British Telecommunications public limited company, England

[21] Appl. No.: 743,362

[22] Filed: Jun. 11, 1985

[30] Foreign Application Priority Data

Jun. 12, 1984 [GB] United Kingdom ................. 8414963
Jun. 14, 1984 [GB] United Kingdom ................. 8415191

[51] Int. Cl.[4] ................................................ H04B 7/24

[52] U.S. Cl. ................................ 342/367; 333/21 R; 343/786

[58] Field of Search ................... 343/16 LS, 756, 786, 343/762, 777, 833; 333/21 R, 125, 126, 135, 137, 21 A, 151, 228, 251, 101; 342/155, 363, 367, 374; 364/514, 516

[56] References Cited

U.S. PATENT DOCUMENTS

| | | | |
|---|---|---|---|
| 2,759,156 | 8/1956 | Younker | 333/21 R X |
| 2,810,890 | 10/1957 | Klopfenstein | 333/135 X |
| 3,085,213 | 4/1963 | Walker | 333/101 |
| 3,383,688 | 5/1968 | Renaudie | 343/786 X |
| 3,423,756 | 1/1969 | Foldes | 343/775 |
| 3,434,142 | 3/1969 | Andre et al. | 343/756 X |
| 3,668,567 | 6/1972 | Rosen | 343/756 X |
| 3,731,235 | 5/1973 | Ditullio et al. | 333/135 |
| 3,821,741 | 6/1974 | D'Oro et al. | 343/786 X |
| 3,906,508 | 9/1975 | Foldes | 343/786 |
| 3,927,347 | 12/1975 | Farney | 315/39.55 |
| 3,936,838 | 2/1976 | Foldes | 343/786 |
| 4,030,048 | 6/1977 | Foldes | 343/786 X |
| 4,052,724 | 10/1977 | Takeichi et al. | 343/786 |
| 4,387,378 | 6/1983 | Henderson | 343/833 |

FOREIGN PATENT DOCUMENTS

| | | | |
|---|---|---|---|
| 1591646 | 3/1967 | Fed. Rep. of Germany . | |
| 2119804 | 8/1972 | France | 343/756 |

OTHER PUBLICATIONS

R. Kreutel et al., "Antenna Technology for Frequency Reuse Satellite Communications"; (Proc. of the IEEE: vol. 65, No. 3, 3/77; pp. 370–378).

M. Skolnik, *Radar Handbook;* pp. 8-7 through 8-13; (McGraw-Hill, 1970).

*Primary Examiner*—Theodore M. Blum
*Assistant Examiner*—Bernarr Earl Gregory
*Attorney, Agent, or Firm*—Nixon & Vanderhye

[57] ABSTRACT

A directive antenna (for a groundstation or a satellite) has a plurality of discrete receptional states which provide predetermined electronic displacements from boresight of the optimum direction of reception. The direction of the target is obtained by rapid switching from one receptional mode to another. The receptional modes are preferably provided by switchable mode converters, e.g. 6A, 6B, 7A and 7B, which are coupled with the waveguide so as to convert higher order propagation modes, e.g. TM01, TE21(H) and TE21(V), to the fundamental.

18 Claims, 11 Drawing Figures

ELECTRONIC TRACKING SYSTEM FOR MICROWAVE ANTENNAS

This invention relates to microwave antennas and particularly to the use of electronic steering of the horn as the input to a feedback loop for steering a microwave antenna.

In the early days of satellite communication, the satellites were in low orbits and, therefore, they moved rapidly across the sky. Thus the tracking systems needed to move the antennas at equivalent speeds.

Many forms of mechanically produced conical scans were proposed and implemented. U.S. Patent Specification No. 3,423,756 describes an electronically produced conical scan and the application to satellite communications is discussed.

In addition a paper by Kitsuregawa and Tachikawa published at IEEE Western Conference of 1962 describes antenna beam scanning produced by TE10 and TE20 modes in a rectangular aperture. The application to long range radar antennas and three dimensional radar antennas is mentioned. Scanning techniques were always difficult to implement because of their inherent complexity.

Later, with improvements in rockets, it became conventional to place satellites in the geostationary orbit which made the tracking of antennas easier. In particular, it was found convenient to adopt step-track systems in which tracking information is obtained by moving the whole antenna. While these systems are usually effective, they tend to be slow and they impose wear on the tracking gear. A paper entitled "The Smooth Step-Track Antenna Controller" by D. J. Edwards and P. M. Terrell published in "International Journal of Satellite Communications" Vol. 1 pp. 133–139 of 1983 describes these systems.

A third technique uses the fact that when the target is off the boresight of an antenna higher order modes, as well as the fundamental, are generated in the waveguide of the antenna. Tracking systems have been utilised in which suitably selected higher order modes are continuously extracted from the waveguide. Measuring the strength of the extracted modes enables pointing errors to be calculated. These systems are effective but complicated. Thus, they require extra equipment, which imposes substantial weight penalties for satellite use and, in any case, constitutes extra capital cost.

The systems described above, namely conical scanning, step-tracking and mode extraction, have given (and in some cases are still giving) satisfactory service but, at least in certain circumstances, improvements are desirable. This is particularly true when the signals are subject to rapid fluctuations and this is a common occurrence when satellites are low on the horizon. For satellite use there is also a need to reduce mass.

We have devised a system with significant improvements. The new electronic system is based on the use of a finite number, for preference four, predetermined displacements of the direction of optimum reception from the boresight of the antenna. The antenna and/or its feed are adapted so that the predetermined displacements are inherent in the construction. The equipment producing each predetermined displacement has a disabled condition in which there is little or no effect on the reception and an enabled condition in which the direction of optimum reception corresponds to the direction inherent in the construction.

In use, a control unit selects one of the plurality of predetermined displacements and it enables the selected displacement. This displaces the direction of reception to its inherent direction. It is emphasised that the control unit merely selects a direction which it cannot otherwise control or adjust.

The enabling of a predetermined direction as described above affects the strength of the received signals. Thus measuring signal strength while a predetermined direction is enabled provides information from which the direction of the target can be calculated.

It is conventional for satellites and earth stations to transmit a beacon signal which carries no traffic. The beacon is used by the receiving station to facilitate correct pointing of the antenna. Preferably the predetermined displacements are frequency selective so that they affect only the beacon.

We have mentioned above, in reference to mode extraction techniques, that higher order modes are generated when the target is off the boresight. In a preferred embodiment of the invention mode converters are associated with the waveguide of the antenna. Each mode converter converts a selected higher order mode, e.g. TM01, TE01, TE21(H) or TE21(V), into the fundamental. This conversion affects the strength of the fundamental so that the direction information is obtained as described above.

It will be appreciated that there is a similarity between our invention and mode extraction in that both use the higher order modes generated by pointing error and the same modes may be common to the two techniques. There is, however, a fundamental difference in the way these modes are measured. Mode extraction continuously separates the selected higher order modes and, therefore, extra radio equipment is needed in addition to the traffic receiver. This is clearly complicated, expensive and, of particular relevance for satellite use, heavy. Mode conversion makes it possible to use the traffic receiver, or at least the microwave and frequency changer thereof, for determining directional information. In any case only one set of radio equipment is needed to measure signal strength because all the higher order modes are converted to the same fundamental. Thus mode conversion systems are inherently less costly, simpler and lighter than mode extraction systems.

The invention is conveniently implemented by providing a mode conversion module comprising a length of, preferably circular, waveguide which is coupled to individual mode converters, e.g. frequency tuned blind waveguides, for the selected modes. Each individual mode converter preferably contains a diode, e.g. a PIN-diode, operable at microwave frequencies. When the diode is "off" the converter has little or no effect on the reception, i.e. "off" corresponds to the disabled state and "on" correspnds to the enabled state or vice versa.

In particular it is convenient to use the converters in pairs, i.e. two converters positioned diametrically opposite one another on the waveguide. The preferred embodiment comprises a pair of TM01-generators axially spaced and perpendicular to a pair of TE21(H)-generators. This embodiment converts received signals in only one plane-of-polarisation but this gives satisfactory directional information. Two planes of polarisation can be converted by providing four TM01-generators and four TE21(H)-generators, i.e. duplicating the preferred arrangement.

Incorporating the mode conversion module in the feed of an antenna produces an antenna according to the invention. Connecting the mode conversion module to both antenna and a radio receiver which includes means for measuring the converted modes produces a complete system which can provide input to a control unit.

It is desirable to incorporate a mode filter, e.g. a mode reflecting filter or a portion of waveguide which supports only fundamental, between the mode conversion module and the receiver. It will be appreciated that the conversion is not 100°/o efficient and it is important to prevent unconverted modes confusing the strength measurement. A mode filter which does not pass the higher order modes, at least those of the beacon frequency, provides this requirement.

The mode filter is preferably constituted as part of the mode conversion module. Thus conversion of an existing system (without automatic pointing) requires only the insertion of the mode conversion unit near the antenna and the provision of signal monitoring and a control unit at receiver baseband. This emphasises the simplicity of the system and the small weight penalty.

In order to obtain best results it is important to operate correct phase-relationships at the launch aperture (i.e. at the end of the feed). The deflection is produced by the interaction of the fundamental and a higher order mode chosen to produce a predetermined deflection. The relationship is such that the higher order mode is in phase quadrature with the fundamental (and mode converters are located so as to produce this relationship). Ideally, the amplitude is not affected by the interaction but the phase is tilted. The primary beam is not deflected with these relationships; the deflection is produced by the interaction of the reflectors of the antenna.

The invention will now be described by way of example with reference to the accompanying drawings in which.

Figure 3:
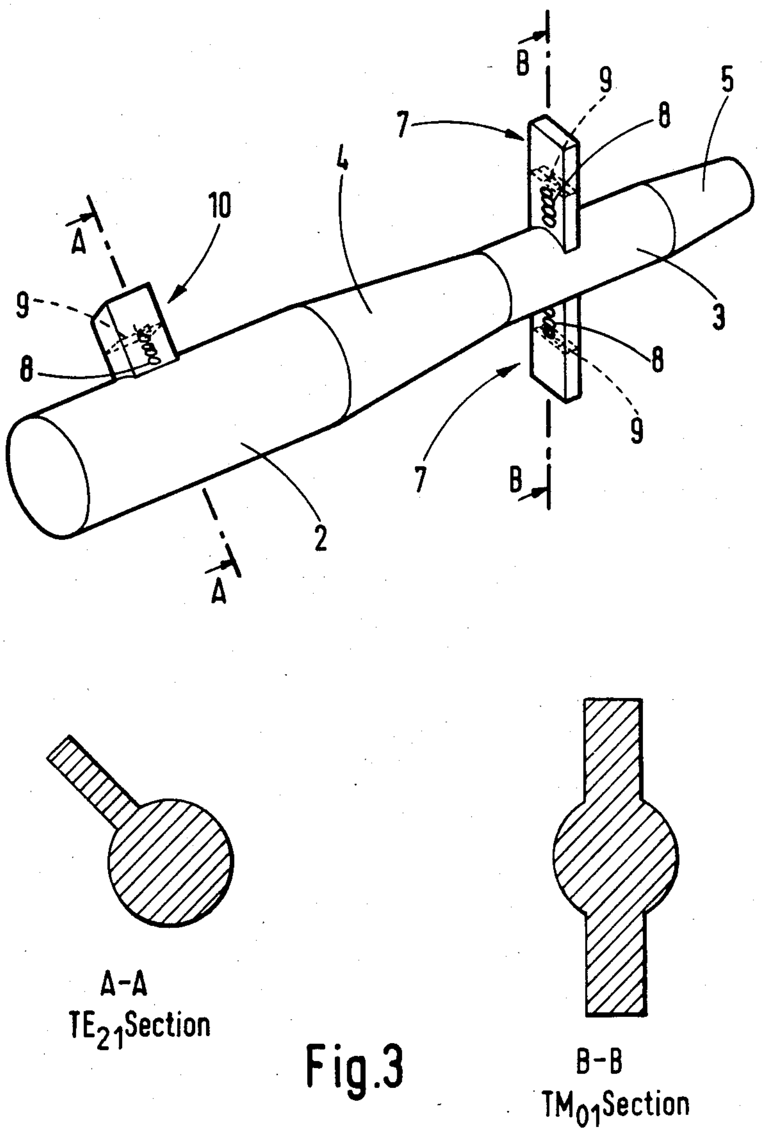
FIG. 3 is a perspective view of an example of a mode conversion module suitable for obtaining complete tracking information with cross-polar compensation from the TM01 and TE21(V) higher order modes with circularly polarised signals.
Figure 3A:
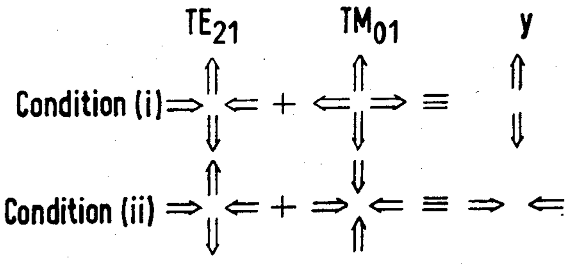

FIG. 3*a* shows electric field pattern diagrams illustrating how the higher order modes in the module of FIG. 3 combine to produce the cross-polar compensated tracking information.

Figure 4:
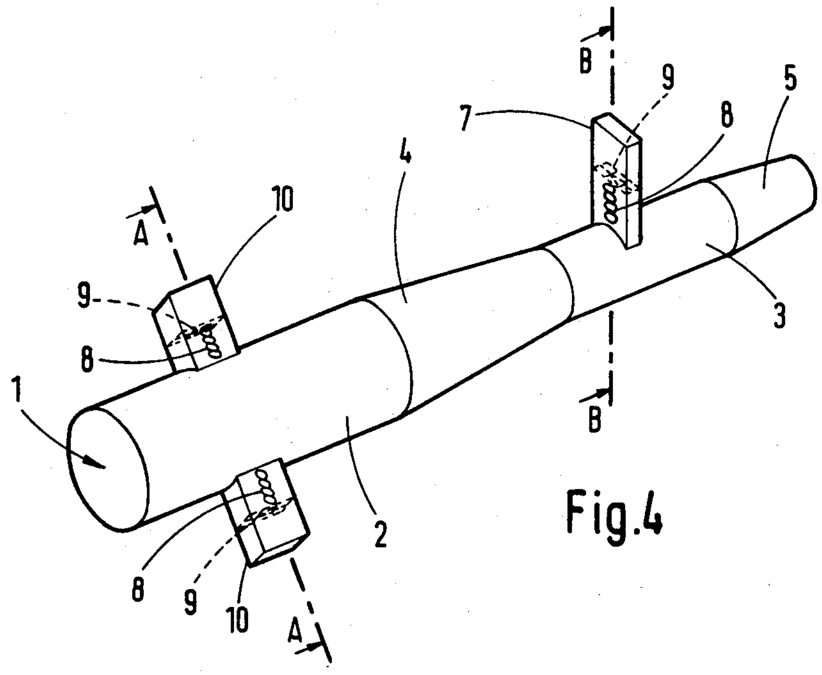
Figure 4A:
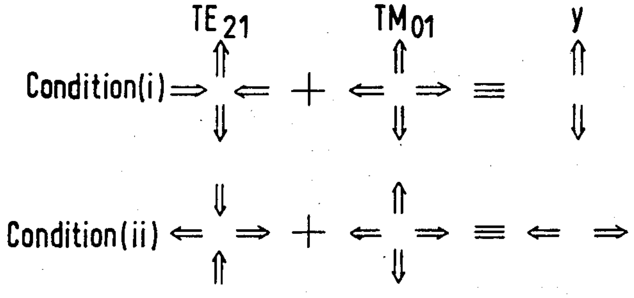

FIGS. 4 and 4*a* are views similar to FIGS. 3 and 3*a* but of an alternative form of the mode conversion module.

Figure 5:
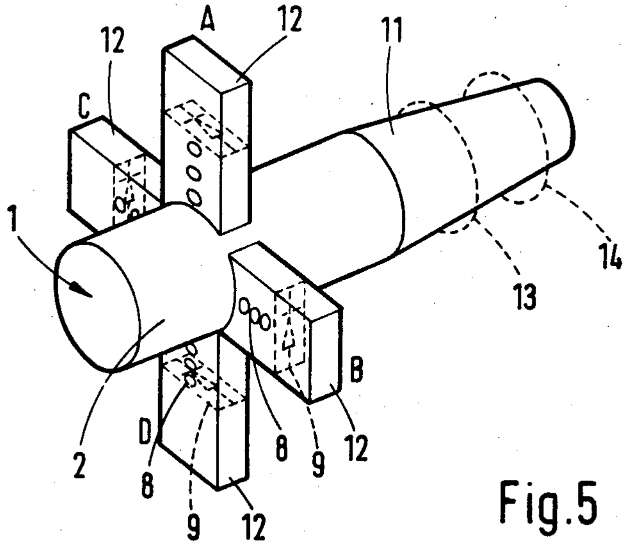

FIG. 5 is a perspective view of another example of a mode conversion module suitable for obtaining complete cross-polar compensated tracking information from the TM01 and TE21(V) modes with circularly polarised signals.

Figure 6:
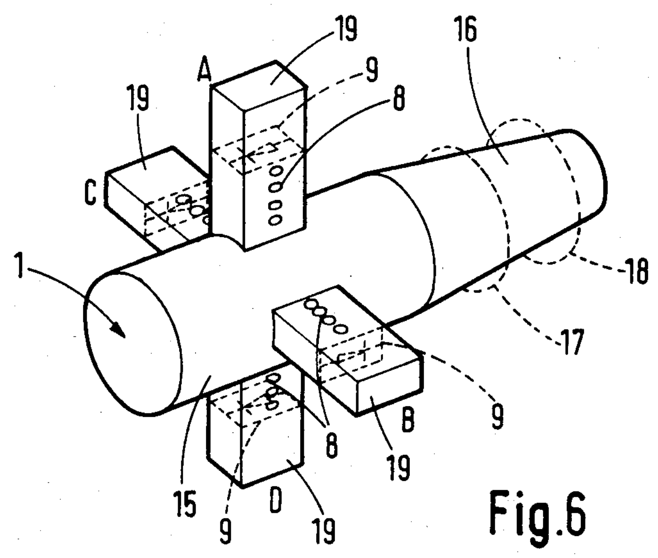

FIG. 6 is a perspective view of an example of a mode conversion module suitable for obtaining complete cross-polar compensated tracking information from the TE01 and TE21(H) modes with circularly polarised signals.

Figure 7:
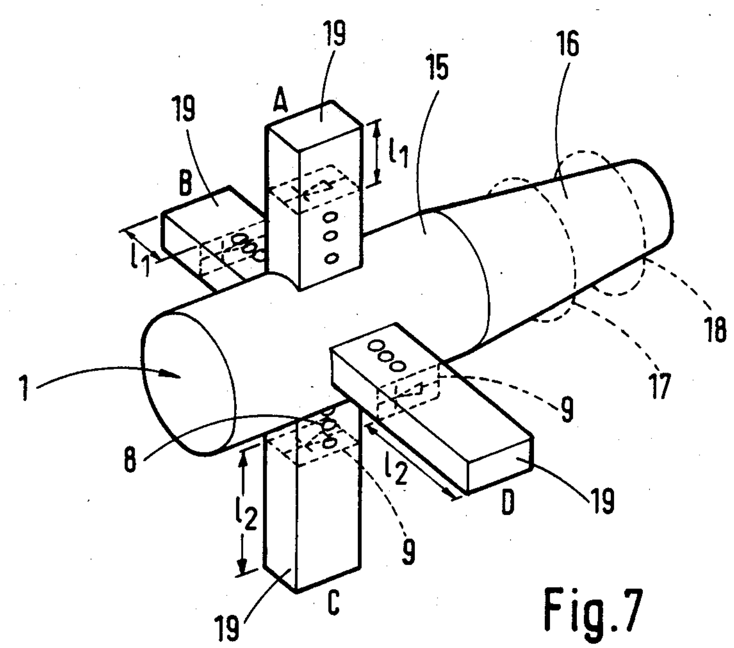

FIG. 7 is a view similar to that of FIG. 6 but showing a modified form of the mode conversion module.

Figure 8:
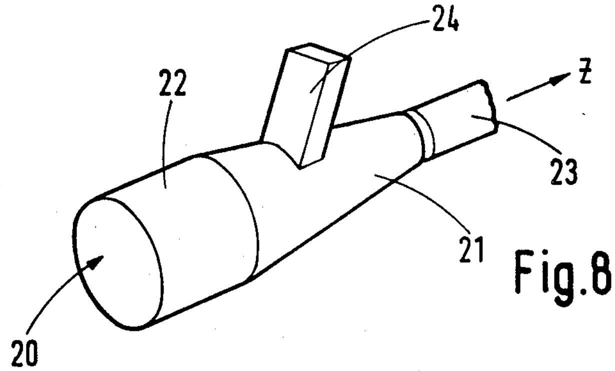
Figure 8A:
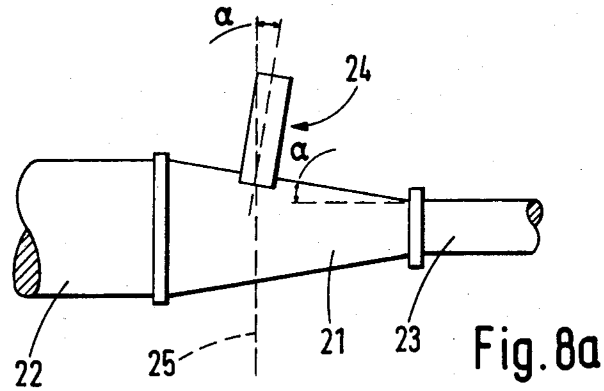

FIGS. 8 and 8*a* are respectively perspective and elevational views illustrating the positioning of a TM01 converter in an evanescent mode conversion module in accordance with the invention.

Figure 9:
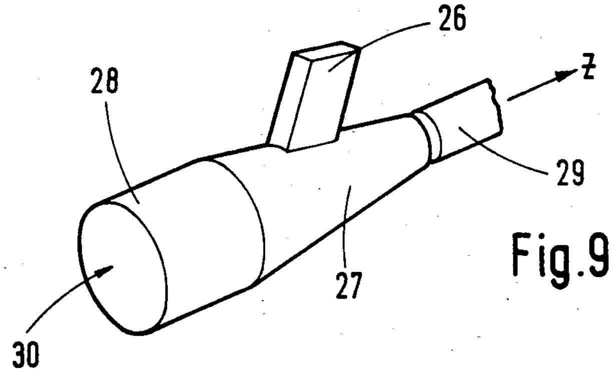
Figure 9A:
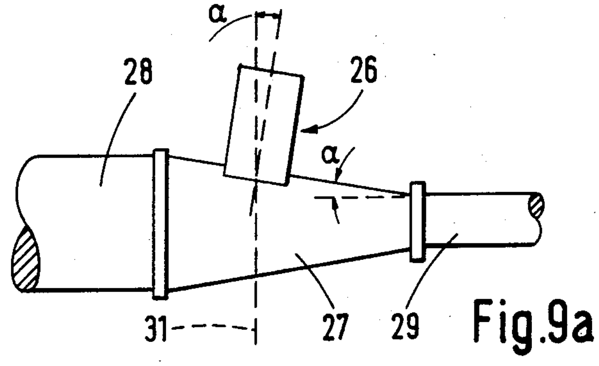

FIGS. 9 and 9*a* are views similar to those of FIGS. 8 and 8*a* but showing the positioning of a TE21(H) mode converter in an evanescent mode conversion module.

Figure 10:
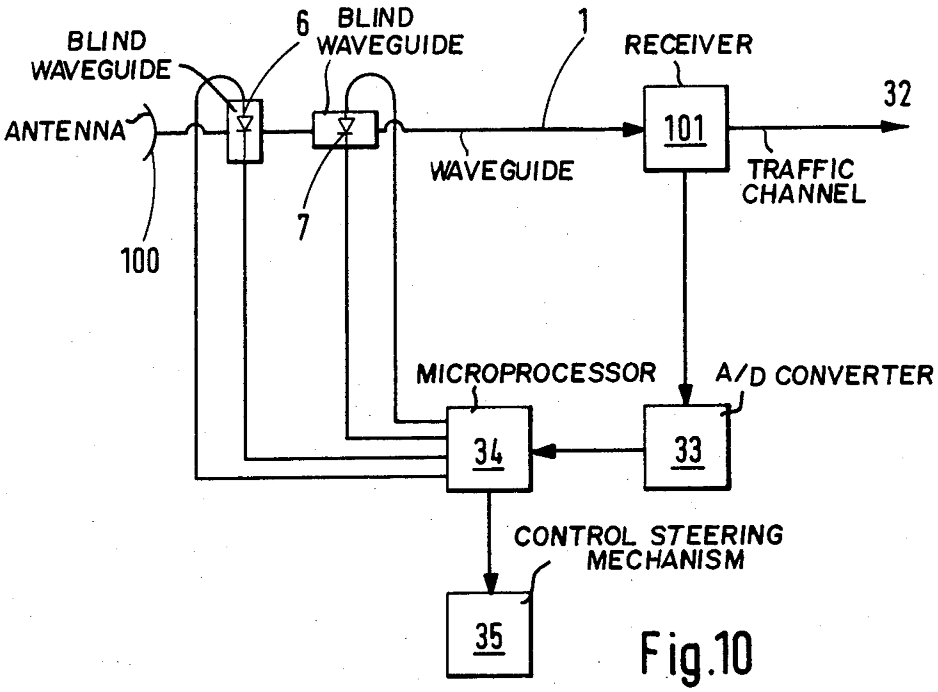

FIG. 10 illustrates the working environment of the invention; and

Figure 11:
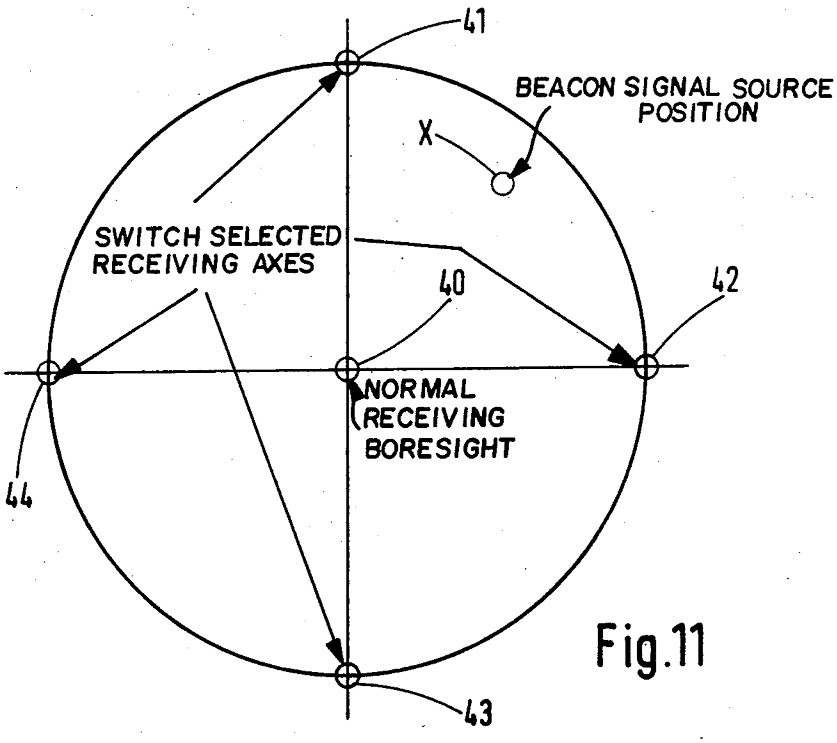

FIG. 11 is a polar diagram indicating important directions.

Figure 1:
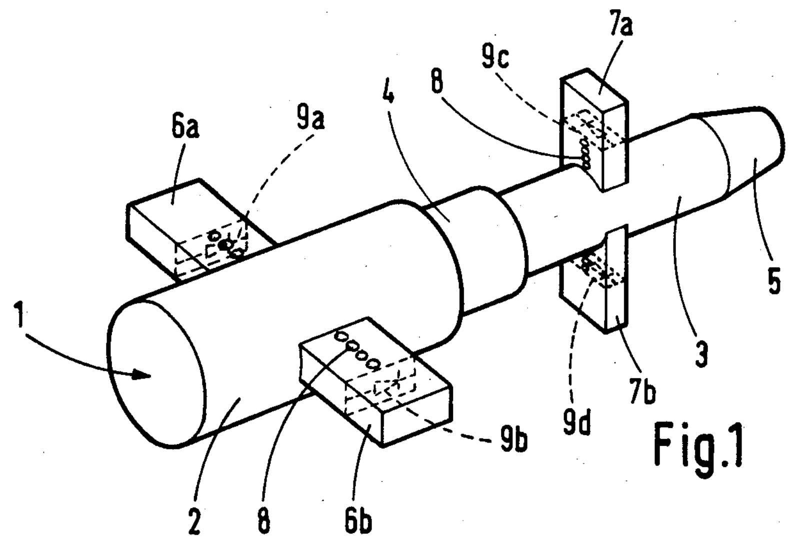
FIG. 1 is a perspective view of an example of a mode conversion module suitable for obtaining complete tracking information from the TM01 and TE21(H) higher order modes with vertical linearly polarised signals.

With reference to FIG. 1, the mode conversion module shown comprises a central circular waveguide 1 having a first section 2 which, in use, will be connnected to the horn of an antenna and which will support the fundamental TE11 mode and at least the higher order TM01 and TE21 modes at the operating frequencies of the antenna, and a smaller diameter second section 3 which will support only the fundamental TE11 mode and the higher order TM01 mode at the operating frequencies. The two sections 2 and 3 are separated from each other by a mode reflecting filter section 4, which is preferably tapered, for reflecting the TE21 modes back towards the horn, and at the downstream end of the second section 3 the central waveguide 1 has a further mode reflecting filter section 5 for reflecting the TM01 mode so that only the fundamental TE11 mode is permitted to exit from the mode converter at the operating frequencies.

One pair of auxiliary blind rectangular waveguides 6A and 6B are coupled longitudinally to the periphery of the first section 2 of the central circular waveguide diametrically opposite each other in the horizontal plane through the circular waveguide axis, and a second pair of auxiliary blind rectangular waveguides 7A and 7B are coupled transversely to the second section 3 of the central waveguide so that they extend vertically diametrically opposite each other in the vertical plane perpendicular to the central waveguide axis. Each of the four auxiliary waveguides 6A, 6B, 7A and 7B contains a band pass filter 8 adjacent the coupling aperture for rejecting all of the operating frequencies of the antenna except the beacon frequency, and a PIN-diode 9 which extends across the waveguide a predetermined distance from its blind end. The position of the diode 9 (9A in 6A, 9B in 6B, 9C in 7A and 9D in 7B) in each auxiliary waveguide 6, 7 is such that when the diode is off (non conducting) the waveguide presents zero impedance to the modes in the central waveguide 1 at the beacon frequency and therefore has no effect, but when the diode 9 is switched on to become conducting, it creates a short circuit plane which, in the case of a waveguide 6, is effective to convert the beacon TE21(H) mode in the central waveguide to a fundamental TE11 mode and, in the case of a waveguide 7, to convert the beacon TM01 mode in the central waveguide also to a fundamental TE11 mode. The TM01 mode is unaffected by the auxiliary. waveguides 6 because their longitudinal coupling apertures are not excited by this mode.

It is important to establish the correct phase relationships between the higher modes and the fundamental at the launch aperture. The required relationship is that the higher order mode is in phase quadrature with the fundamental and the axial positions of the converters on the waveguide are chosen so as to give this relationship.

The optimum position is dependant on factors such as the dimensions of the horn and, in particular, the wavelength at which mode conversion is carried out. It should be noted that the optimum distance is different for the TM01-mode and the TE21(H) mode which is why blind waveguides 6 are axially separated from blind waveguides 7.

Furthermore, the mode reflecting filter section 4 is preferably arranged to provide a reflection plane for the beacon TE21(H) mode at a distance from the auxiliary waveguides 6 such as to produce constructive interference between the incident and reflected beacon TE21(H) modes in the conversion plane defined by the waveguides 6, and the mode reflecting filter section 5 is arranged to provide a similarly acting reflecting plane for the beacon TM01 mode relative to the auxiliary waveguides 7.

As explained previously, in use, the diodes 9 of the auxiliary waveguides 6 and 7 are controlled so that each auxiliary waveguide is rendered operative (diode on) in turn while the others are inoperative (diodes off), the converted fundamental mode created by the operative auxiliary waveguide combining with the existing beacon fundamental mode to produce a beam shift in an antenna system which includes the mode conversion module. The fundamental mode, which includes both what was originally present as well as that produced by conversion, will be conducted to the radio receiver having a beacon channel connected to a tracking receiver for determining information which relates to the pointing direction for the antenna and which will be contained by the shifted beam. The tracking receiver is operated synchronously with the switching of the auxiliary waveguides so that the tracking information is properly identified and processed. The vertical auxiliary waveguides 7 provide elevation plane ($\Delta y$ up and down) tracking information, and the lateral auxiliary waveguides 6 provide azimuth plane ($\Delta x$ left and right) tracking information.

By reversing the orientation of the auxiliary waveguides so that the TE21(H) mode converting waveguides 6 lie in a vertical plane through the central waveguide axis and the TM01 mode converting waveguides 7 extend horizontally, a mode conversion module will be obtained which will provide tracking information with horizontally linearly polarised signals. In this case it will be the waveguides 6 which will provide the elevation plane information, and the waveguides 7 which will provide the azimuth plane information.

Figure 2:
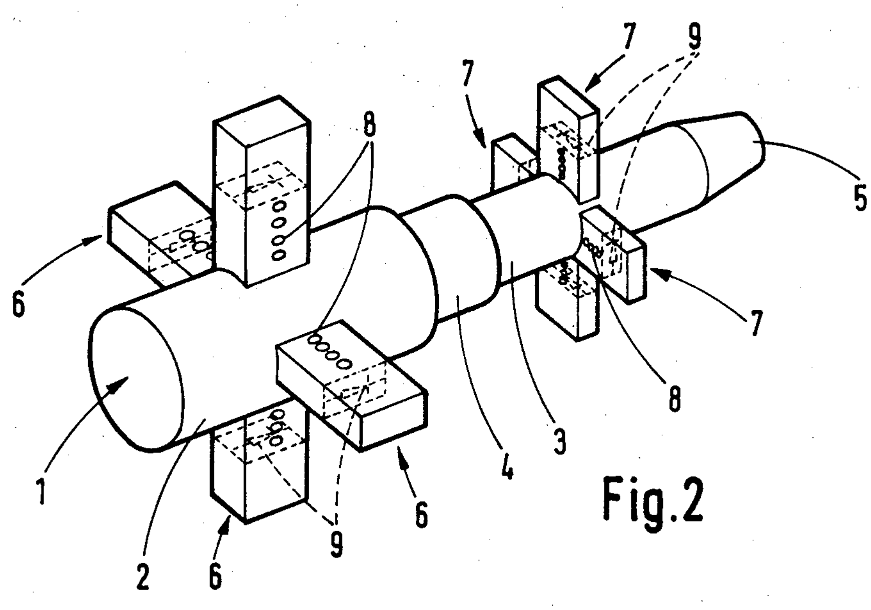
FIG. 2 is a perspective view of an example of a mode conversion module similar to that of FIG. 1 but capable of obtaining complete tracking information with circularly polarised signals (vertical or horizontal).

The mode conversion module illustrated in FIG. 2 is effectively a combination of the vertical linear polarisation converter of FIG. 1 and its horizontal linear polarisation counterpart mentioned above. Consequently the converter of FIG. 2 is identical to that of FIG. 1 with the addition of a further pair of TE21(H) mode converting waveguides 6 extending vertically, and a further pair of TM01 mode converting waveguides 7 extending horizontally. Such a converter can be used to obtain tracking information with either vertical or horizontal linearly polarised signals by operation of the appropriate auxiliary wavevuides, and in addition it can be used to obtain tracking information with circularly polarised signals by operation of appropriate auxiliary waveguides. For example, either the TM01 mode converting waveguides 7 can be used to give the vertical polarisation/elevation plane information and horizontal polarisation/azimuth plane information, or the TE21(H) mode converting waveguides 6 may be used to give vertical polarisation/azimuth plane information and horizontal polarisation/elevation plane information.

In the examples described so far the radiation pattern of each shifted fundamental mode beacon beam used to derive the required tracking information will possess a cross-polar component corresponding to that of the higher order mode which is converted to produce the beam shift. In some systems this will not be acceptable, and one example of a mode converter which can be used to provide $\Delta x/\Delta y$ tracking information while avoiding cross-polar contamination is shown in FIG. 3. In this case the central circular waveguide is constructed in the same way as that of the FIG. 1 example, and corresponding parts have been given the same reference numerals. In addition the second section 3 of the central waveguide has coupled to it a pair of TM01 mode converting auxiliary blind rectangular waveguides 7 which are the same as those in FIG. 1 and are coupled to the section 3 in the same way. In contrast however, the first section 2 of the central waveguide has only a single auxiliary blind rectangular waveguide coupled to it as shown at 10. This waveguide 10 is coupled longitudinally to the central waveguide and is offset angularly with respect to the upper auxiliary waveguide 7 by an angle of 45°. The auxiliary waveguide 10 is constructed in the same way as the other auxiliary waveguides with a beacon frequency bandpass filter 8 and a PIN-diode 9 for selectively rendering the waveguide operative or inoperative, and is positioned to be excited by the TE21(V) mode. In use this TE21(V) mode converting auxiliary waveguide 10 will be rendered operative (diode on) simultaneously with each of the TMOI converting auxiliary waveguides 7 alternately, producing alternate shifts of the fundamental mode beacon beam vertically and sideways. The vertically shifted beam will provide vertical polarisation/elevation plane tracking information, and the horizontally shifted beam will provide horizontal polarisation/azimuth plane tracking information, and FIG. 3*a* illustrates how the radiation patterns of the TE21(V) and TM01 modes combine to cancel cross-polar components from the radiation pattern of the shifted fundamental mode beacon beam in each case.

FIG. 4 shows an alternative construction for the mode conversion module of FIG. 3. In this case there is only a single TM01 mode converting auxiliary waveguide 7, and an additional identical TE21(V) mode converting auxiliary waveguide 10 is coupled longitudinally to the first central waveguide section 2 diametrically opposite the other auxiliary waveguide 10. Operation of the TM01 mode converting auxiliary waveguide 7 simultaneously with each of the TE21(V) mode converting auxiliary waveguides 10 alternately will produce alternate beam shifts giving vertical polarisation/elevation plane low cross-polar tracking information and horizontal polarisation/azimuth plane low cross-polar tracking information.

FIG. 5 illustrates another example of a mode conversion module in accordance with the invention which can be used to provide low cross-polar tracking information for circularly polarised signals from the higher order TM01 and TE21(V) modes. In this case the central circular waveguide 1 comprises a cylindrical section 2 similar to that of the previous examples but leading into a tapering mode reflecting filter section 11 which will reflect all of the higher order modes and allow only the fundamental TE11 modes to pass at the operating frequencies. Four identical auxiliary blind rectangular waveguides 12 are coupled transversely to the periphery of the central waveguide section 2 at right angles to each other and in a common vertical plane perpendicular to the central waveguide axis. As in previous examples, each auxiliary waveguide 12 comprises a beacon frequency bandpass filter 8 and a PIN-diode 9 for rendering the waveguide selectively operative or inoperative. In this case the coupling aperture of each auxiliary waveguide 12 will be excited by both of the TM01 and TE21(V) modes at the beacon frequency when the waveguide is operative and will produce a fundamental TE11 mode from each. As in previous examples suitably positioned TE21 and TM01 mode reflecting planes 13 and 14 respectively will be provided by the mode reflecting filter section 11 for improving the conversion efficiency. of these modes at the beacon frequency in the plane of the auxiliary waveguides 12.

In operation the upper and right-hand auxiliary waveguides 12 will be rendered operative simultaneously while the other two auxiliary waveguides are inoperative, and will provide vertical polarisation/elevation plane (up) and horizontal polarisation/azimuth plane (right) low cross-polar tracking information, and then these two auxiliary waveguides will be rendered inoperative while the lower and left-hand waveguides 12 are rendered operative to provide vertical polarisation/elevation plane (down) and horizontal polarisation/azimuth plane (left) low cross-polar tracking information.

FIG. 6 shows an example of a mode converter which is similar to that of FIG. 5 but which is designed to obtain the required low cross-polar tracking information for circularly polarised signals from the TE01 and TE21(H) modes. In this case the central circular waveguide 1 has a cylindrical section 15 designed to support the higher order TE01 mode in addition to the fundamental TE11 mode and the higher order TE21 and TM01 modes, and a mode reflecting filter section 16 designed to reflect all higher order modes at the operating frequencies and having suitably positioned TE01 and TE21 beacon mode reflecting planes 17 and 18 relative to the corresponding mode converting auxiliary blind rectangular waveguides 19 coupled to the central waveguide section 15. These auxiliary waveguides 19 are identical to each other with beacon frequency bandpass filters 8 and pin diodes 9 as described in previous examples, and are coupled longitudinally to the central waveguide at equi-angular intervals so that they lie in horizontal and vertical planes through the axis of the central waveguide. With this arrangement the TE21(V) and TM01 modes will not excite the coupling apertures of the auxiliary waveguides, but when rendered operative each auxiliary waveguide 19 will produce a fundamental TE11 mode from both the TE01 and TE21(H) modes in the circular waveguide. In use, the auxiliary waveguides 19 will be operated in a similar manner to the waveguides 12 of the FIG. 5 example, the upper and right-hand auxiliary waveguides providing horizontal polarisation/elevation plane (up) and vertical polarisation/azimuth plane (right) low cross-polar tracking information, and the lower and left-hand auxiliary waveguides providing horizontal polarisation/elevation plane (down) and vertical polarisation/azimuth plane (left) low cross-polar tracking information.

FIG. 7 shows an example of a mode conversion module which is identical to that of FIG. 6 except that the lower and right-hand auxiliary waveguides are made longer than their opposite counterparts by a distance equal to half a wavelength at the beacon frequency. In this case however, all of the auxiliary waveguides 19 will be rendered operative or inoperative simultaneously to provide the required horizontal polarisation-/elevation plane and vertical polarisation/azimuth plane low cross-polar tracking information, and the effect of the increase in length of two of the auxiliary waveguides is to boost the converted mode strength.

As will be appreciated, in all of the examples described so far the mode converting auxiliary waveguides are coupled to one or more cylindrical sections of the central circular waveguide and are separate from the mode reflecting filter section or sections. However, as has been mentioned, the mode converter in accordance with the invention may be constructed as an evanescent mode converter in which the auxiliary waveguides are coupled to the mode reflecting filter section or sections of the central circular waveguide, and it should be appreciated that each of the previous examples may be realised in such a form if so desired. FIGS. 8 and 9 illustrate the principles of construction of an evanescent mode conversion module in accordance with the invention. FIG. 8 shows a portion of a central circular waveguide 20 in which a tapering mode reflecting filter section 21 separates an upstream cylindrical section 22, which will support the fundamental TE11 modes and the higher order TM01 mode at the operating frequencies, from a downstream cylindrical section 23 which will support only the fundamental TE11 modes. One auxiliary blind rectangular waveguide 24 is shown coupled transversely to the mode reflecting filter section 21 and extending perpendicularly to the filter section 21, i.e. at an angle $\alpha$ to the vertical equal to the taper angle of the filter section 21. The coupling aperture of the auxiliary waveguide 24 is located in the cut-off plane 25 for the TM01 mode at the beacon frequency, although it may. be located just beyond this plane but before a position where the TM01 mode is completely attenuated. The auxiliary waveguide 24 is constructed in exactly the same way as the corresponding waveguides 7 in previous examples, i.e. with a beacon frequency bandpass filter (not shown) and a PIN-diode (not shown) for selectively rendering the auxiliary waveguide operative and inoperative, and when rendered operative the auxiliary waveguide 24 will act to convert a vertically polarised TM01 mode at the beacon frequency to a fundamental TE11 mode, creating an upward beam shift which will provide vertical polarisation/elevation plane tracking information in the upper quadrant. It will of course be appreciated that, in practice, one or more additional TM01 mode converting auxiliary waveguides 24 will be coupled to the mode reflecting filter section 21 in the same plane, depending on the tracking capability which is required.

FIGS. 9 and and 9*a* illustrate the corresponding arrangement for a TE21(H) mode converting waveguide, showing the necessary auxiliary blind rectangular waveguide 26 coupled longitudinally to the tapering mode reflecting filter section 27 between two cylindrical sections 28 and 29 of the central circular waveguide 30. The cylindrical section 28 will support the fundamental TE11 modes and at least the higher order TE21 and TM01 modes, and the coupling aperture of the auxiliary waveguide 26 is located at or just beyond the cut-off plane 31 for the TE21 mode at the beacon frequency. The auxiliary waveguide 26 extends perpendicularly to the tapering mode reflecting filter section 27, and is constructed in the same way as the corresponding auxiliary waveguides 6 in previous examples so that, when rendered operative, it will act to convert a horizontally polarised TE21(H) mode at the beacon frequency to a fundamental TE11 mode, creating an upward beam shift which will provide horizontal polarisation/elevation plane tracking information in the upper quadrant. Again, in practice one or more additional TE21(H) mode converting auxiliary waveguides 26 will be coupled to the mode reflecting filter section 27 in the same plane depending on the tracking capability required.

In an evanescent mode conversion module constructed in accordance with the principles described with reference to FIGS. 8 and 9, the cylindrical section 29 of the central circular waveguide portion shown in FIG. 9*a* may also form the cylindrical section 22 of the central waveguide portion shown in FIG. 8*a*. Alternatively, the cylindrical section 29 may be made equivalent to the cylindrical section 23 of the central waveguide portion shown in FIG. 8*a,* which supports only the fundamental TE11 modes at the operating frequencies. In this case the mode reflecting filter section 27 will include cut-off planes for both the TE21 and TM01 modes, and will have both TE21 mode converting auxiliary waveguides 26 and TM01 mode converting auxiliary waveguides 24 coupled to it as described.

In FIGS. 1 to 9, and in the text relating to these Figures, we have illustrated and described several embodiments suitable for implementing this invention. Each mode generation module comprises a plurality of blind waveguides, i.e. three, four or eight, and each blind waveguide includes a PIN-diode. When the PIN-diode is "off" its blind waveguide has no effect on the progation of the waveguide. When the PIN-diode is "on" its blind waveguide becomes effective and a higher order mode is, at least partly, converted to the fundamental. The effect of this conversation is to turn the optimum direction of reception of the antenna through an angle of about 0.05° (about 3′ of arc). (It is convenient to call this displacement a "squint".) The transition between the normal (i.e. boresight) operation and squinted operation takes only a small fraction of a second and rapid switching is possible. Thus a single generator provides a basis for obtaining information about one direction other than the boresight.

The mode conversion module shown in FIG. 1, which has four blind waveguides, provides the basis for obtaining information in four directions in addition to the boresight direction. In order to operate the system it is necessary to connect the PIN-diodes 9 to a control unit which activates the PIN-diodes 9 and receives measurements of the variations in the beacon signal. The working environment which achieves this is illustrated (diagrammatically) in FIG. 10.

The receiving system of a ground station or satellite comprises an antenna 100 connected to radio receiver 101 by waveguide 1. The receiver demodulates and obtains traffic on channel 32; the "squinting" system is designed so as not to affect the traffic. In addition to traffic, the receiver 101 "demodulates" the beacon which results in a steady signal (because the beacon is not modulated). This provides a digital signal, giving the strength of the beacon to a microprocessor 34 (which is also connected to control steering mechanism 35). The system according to this invention includes pairs of blind waveguides 6 and 7 as described above. The PIN-diodes 9 are connected to microprocessor 34.

Microprocessor 34 can operate a search pattern by actuating the generators in sequence. Actuating one of the blind waveguides squints the (received) beam and changes the measurement returned to the microprocessor 34 by A/D converter 33. Thus the microprocessor obtains directional information from which the directional location of the beacon signal is determined. The directional location is obtained relative to the boresight of the antenna so that it constitutes an error signal which is suitable for input to a feedback loop which controls the steering mechanism 35 to move the antenna so that the boresight is moved towards alignment with the beacon signal.

The operation of the system is further explained with reference to FIG. 11 which is a polar diagram showing directional locations relative to the boresight. The diagram takes the form of a circle. The centre 40 represents the direction of the boresight and the circumference represents a deviation of 3′ of arc from the boresight. The directions of the four "squinted" axes, which are spaced at 90° intervals around the circumference, are represented by 41 (produced when PIN-diode 9A is activated), 42 (PIN-diode 9B), 43 (PIN-diode 9C) and 44 (PIN-diode 9D). (It will be appreciated that the axial directions indicated in FIG. 5 are associated with maxima of reception. A beam situated off an axis is still received but the reception is weaker by reason of the displacement.)

Consider a beacon (from a satellite or earth station) located at position X of FIG. 11 and assume that this position is not known at the receiving station. To locate the position, microprocessor 34 runs a search pattern in which the reception direction of beacon signal is switched from boresight 40 to each of positions 41, 42, 43 and 44 in turn. The intensity of beacon signal at each position is measured by A/D converter 33 and each measurement is passed to microprocessor 34 where it is stored in conjunction with its direction. The rapid switch-and-measure sequence enables the whole search pattern to be completed in a small fraction of a second. Although the beacon signal, i.e. point X of FIG. 11, is always moving no substantial change of position occurs in this timeframe. Thus the four measurements of the search pattern can be regarded as simultaneous.

It will be apparent that for position X of FIG. 11, directions 41 and 42 will give stronger signals than directions 43 and 44. Also direction 41 will give a stronger signal than direction 42. Using data about the off-axis performance of each direction the direction of position X is computed and this provides an error signal for the feedback loop operating the steering.

The "squinting" arrangements operate quickly and this makes it possible to obtain a sequence of positions at short time intervals which provides plenty of data for a prediction algorithm. Thus in the case of an earth station using well established information about satellite orbits, the algorithm can predict the direction of the satellite. It is also possible to estimate the time required for a steering operation and hence to obtain a predicted final position where the satellite will be at the end of the steering operation. The predicted position constitutes a particularly suitable input for the feedback loop.

As has been stated above predicting algorithms are already used to steer antennas using the steering motors to obtain the directional information needed. (This may require overlaying a steering motion with a search pattern.) This is slow and the execution of search patterns causes substantial wear and tear on the steering motors.

Our invention obtains the data using electrical methods. This reduces the use of the steering motors and obtains more data in a shorter time whereby. the performance of prediction algorithms is enhanced. It simplifies searching during steering since fundamentally different systems are used for the two operations.

It will be appreciated that the same considerations also apply when the invention is used in a satellite. In this case, the steering can be achieved by actuating the attitude controls of the satellite as well by changing the configuration of an antenna relative to the rest of the satellite. The system according to the invention has relatively low mass. This is clearly an important advantage for satellite use.

(If it is not convenient to use an independent beacon signal any other convenient signal, e.g. part of the traffic, may be used instead.)

We claim:

1. A directive antenna which includes electrical means for providing said antenna with a plurality of different receptional states, each such state including a corresponding preferred off-boresight signal reception direction for at least one signal frequency, the antenna comprising:

a waveguide adapted to support a fundamental signal propagation mode associated with boresight reception and a plurality of discrete higher order signal propagation modes associated with said receptional states, said waveguide being coupled to a plurality of propagation mode conversion cavities each of which is switchable between a disabled condition in which it has little effect on the mode of propagation of the waveguide and an enabled condition in which it converts a higher order signal propagation mode to said fundamental signal propagation mode so as to displace the direction of optimum reception from the boresight to a predetermined off-boresight direction.

2. An antenna according to claim 1, wherein said receptional states are tuned to affect a beacon frequency without affecting other frequencies.

3. An antenna according to either claim 1 or claim 2, wherein the number of receptional states is four.

4. An antenna according to any one of claims 1 or 2, which includes a waveguide adapted to support a fundamental propagation mode associated with boresight reception and a plurality of discrete higher order propagation modes associated with the receptional states, wherein said waveguide is coupled to a plurality of propagation mode converters each of which is switchable between a disabled condition in which it has little or no effect on the mode of propagation of the waveguide and an enabled condition in which it converts a higher order propagation mode to the fundamental propagation mode.

5. An earth station antenna system; adapted for communication with a telecommunications satellite, while earth station antenna system comprises an antenna according to claim 1 or 2 and also further comprises:

a control unit and a radio receiver operatively connected to the antenna so as to measure the strengths of beacon signals received by the antenna, and said control unit being adapted to enable a selected one of the plurality of receptional states and accept from the radio receiver a corresponding signal strength measurement thereby obtaining data for predicting the direction of a beacon signal received by the antenna.

6. A mode conversion module, suitable for use in an antenna, which module comprises:

a waveguide for incorporation into an antenna feed, coupled to a plurality of propagation mode converters each of which has a disabled condition and an enabled condition in which said mode conversion module converts a higher order signal propagation mode to the fundamental signal propagation mode.

7. A module according to claim 6 in which the waveguide has a circular cross-section and each converter is such that, when in the enabled condition, the higher mode which it converts to fundamental includes at least one of the higher modes TE01, TM01, TE21(H) and TE21(V).

8. A module according to claim 6; which comprises a pair of TM01 converters and a pair of TE21(H) converters, the members of each pair being on diametrically opposite sides of the waveguide and the two pairs being mutually perpendicular and spaced apart along the length of the waveguide.

9. A module according to claim 6 in which each mode converter contains a diode operative at microwave frequencies and capable of being in one of predetermined "on" and "off" conditions, one of said conditions of the diode providing the enabled condition of the converter and the other condition of the diode providing the disabled condition of the converter.

10. A module according to claim 9, wherein the diode is a PIN-diode.

11. A module according to claim 6; wherein each converter includes filter-means for accepting a beacon frequency and rejecting other frequencies.

12. A module according to claim 6 the waveguide includes a mode filter for preventing the transmission of higher order propagation mode to a radio receiver.

13. A module according to claim 12, wherein each mode converter is located on the waveguide at a position close to the limit of propagation of the mode which it is adapted to convert.

14. A directive antenna comprising a primary radiator situated at the focus of a reflector system for producing a directive beam wherein said primary radiator is connected to a mode conversion module according to claim 6.

15. An antenna according to claim 14 wherein each mode converter is situated at a distance from a launch aperture of the primary radiator such that the mode which it is adapted to convert is in phase quadrature with said fundamental at said launch aperture.

16. Apparatus comprising:

a directive antenna;

electrical means for providing said antenna with a plurality of different receptional states, each such state including a corresponding preferred off-boresight signal reception direction for at least one signal frequency;

said antenna including a waveguide adapted to support a fundamental signal propagation mode associated with boresight reception and a plurality of discrete higher order signal propagation modes associated with said receptional states;

said waveguide being coupled to a plurality of propagation mode conversion cavities each of which is switchable between a disabled condition in which it has little effect on the mode of propagation of the waveguide and an enabled condition in which it converts a higher order signal propagation mode to said fundamental signal propagation mode so as to displace the direction of optimum reception from the boresight to a predetermined off-boresight direction;

a radio receiver and a control unit operatively connected to said antenna, wherein said radio receiver measures the strength of received signals and said control unit enables a selected one of the plurality of receptional states and accepts from the radio receiver signal strength measurements, thereby obtaining data for predicting the direction of signals received by the antenna.

17. A vehicle antenna system suitable for injection into orbit which comprises:

a directive antenna;

electrical means for providing said antenna with a plurality of different receptional states, each such state including a corresponding preferred off-boresight signal reception direction for at least one signal frequency;

said antenna including a waveguide adapted to support a fundamental signal propagation mode associated with boresight reception and a plurality of discrete higher order signal propagation modes associated with said receptional states;

said waveguide being coupled to a plurality of propagation mode conversion cavities each of which is switchable between a disabled condition in which it has little effect on the mode of propagation of the waveguide and an enabled condition in which it converts a higher order signal propagation mode to said fundamental signal propagation mode so as to displace the direction of optimum reception from the boresight to a predetermined off-boresight direction;

a control unit and a radio receiver operatively connected to the antenna and adapted to measure the strengths of received beacon signals, and the control unit being adapted to enable a selected one of the plurality of receptional states and accept from the radio receiver a corresponding signal strength measurement thereby obtaining data for predicting the direction of a beacon signal received by the antenna.

18. An improved microwave antenna tracking and steering system of the squinting type which is capable of being electrically steered to a selected one of plural predetermined off-boresight directions so as to gather data used to controllably reposition the antenna while tracking a remote microwave signal source, said system comprising:

a microwave antenna having a predetermined boresight axis along which is achieved optimal microwave signal reception;

a microwave waveguide structure operatively coupled to pass microwave signals from said antenna in a predetermined fundamental mode of signal transmission;

a plurality of electrically activatable mode conversion cavities, each cavity being disposed at a predetermined respective position about the periphery of said waveguide structure so as to convert a predetermined higher order mode of microwave signal transmission, if present within the waveguide, to said fundamental mode for subsequent signal transmission down the waveguide as a fundamental mode signal thereby enhancing the apparent fundamental signal strength and also representing an off-boresight redirection of the antenna for at least one microwave frequency;

a microwave receiver coupled to receive and process said fundamental mode microwave signals output from said waveguide and including means providing signal strength measurement data therefor;

data processing and control means connected to selectively and sequentially activate at least one of said mode conversion cavities, via electrical signals passed thereto, and to record and process data representing the resulting relative fundamental mode signal strengths for the corresponding off-boresight directions so as to generate tracking control signals representing the location of the signal source to be tracked with respect to the current boresight direction; and antenna steering means connected to receive said tracking control signals and to correspondingly reposition the antenna boresight towards said signal source location.

* * * * *

UNITED STATES PATENT AND TRADEMARK OFFICE
CERTIFICATE OF CORRECTION

PATENT NO. : 4,704,611

DATED : November 3, 1987

INVENTOR(S) : EDWARDS et al

It is certified that error appears in the above-identified patent and that said Letters Patent is hereby corrected as shown below:

In the claims, redundant claim 4 at column 11, lines 46 through 57 should be deleted;

Column 11, line 58, ";" should be changed to --,-- ; and

Column 11, line 59, "while" should be changed to --which--.

Signed and Sealed this

Twelfth Day of July, 1988

*Attest:*

DONALD J. QUIGG

*Attesting Officer*

*Commissioner of Patents and Trademarks*